3,405,147
17 - PHENYLALIPHATYLESTRA - 1,3,5(10) - TRIEN-
3 - OLS, 16 - DEHYDRO DERIVATIVES CORRE-
SPONDING AND ESTERS THEREOF
Raymond E. Counsell, Ann Arbor, Mich., and Paul D.
Klimstra, Northbrook, Ill., assignors to G. D. Searle &
Co., Chicago, Ill., a corporation of Delaware
No Drawing. Filed Feb. 25, 1966, Ser. No. 529,931
8 Claims. (Cl. 260—397.5)

The present invention is concerned with novel steroidal derivatives characterized by a 17-phenylaliphatyl side chain. Those derivatives are, more particularly, 17-phenylaliphatylestra - 1,3,5(10) - trien - 3 - ols, 16 - dehydro derivatives corresponding and esters thereof represented by the following structural formula

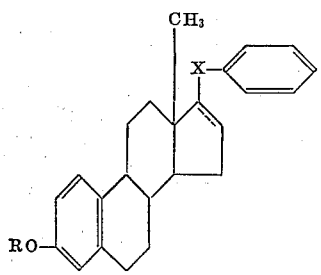

wherein R can be hydrogen or a lower alkanoyl radical, X is a lower alkylene, ethynylene or vinylene radical and the dotted line is indicative of an optional 16,17 double bond.

The lower alkanoyl radicals symbolized by R are typified by formyl, acetyl, propionyl, butyryl, valeryl, caproyl, heptanoyl and the branched-chain groups isomeric therewith.

Examplies of lower alkylene radicals encompassed by X are methylene, ethylene, trimethylene, tetramethylene, pentamethylene and the branched-chain isomers thereof.

The compounds of the present invention are conveniently produced by utilizing as starting materials the 17α-phenylaliphatylestra-1,3,5(10)-triene-3,17β-diols and esters of the structural formula

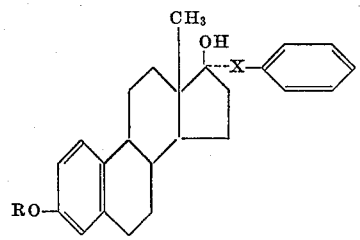

wherein R and X are as hereinbefore defined. Those substances together with methods for their preparation are described in U.S. Patent 3,193,564, issued July 5, 1965. When those 17-hydroxy compounds are contacted in an organic solvent medium with a suitable dehydrating agent, typically a strong acid such as hydrochloric or p-toluenesulfonic, the instant 16-dehydro derivatives are produced. If that process is carried out in the presence of an acylating agent, the 3-hydroxy group is acylated concurrently. Specific examples of that process are the reaction of 17α-phenylethynylestra - 1,3,5(10) - triene - 3,17β - diol with p-toluenesulfonic acid and isopropenyl acetate to afford 17-phenylethynylestra - 1,3,5(10), 16 - tetraen - 3 - ol 3-acetate and the reaction of that same starting material with concentrated hydrochloric acid in methanol to yield 17-phenylethynylestra-1,3,5(10),16-tetraen-3-ol.

An alternate process for the manufacture of the 17-phenylvinyl compounds of this invention involves the partial reduction, as by catalytic hydrogenation, of the corresponding phenylethynyl substances. A specific illustration is the hydrogenation of 17-phenylethynylestra-1,3,5(10),16-tetraen-3-ol in dioxane-pyridine solution, using 5% palladium-on-calcium carbonate catalyst, thus resulting in 17-phenylvinylestra-1,3,5(10),16-tetraen-3-ol.

When the aforementioned 17-phenylethynyl or 17-phenylvinyl- compounds are hydrogenated with a palladium-carbon catalyst, complete saturation occurs to yield the instant 3-oxygenated phenethylestra-1,3,5(10)-trienes, which are obtained as mixtures of the 17α and 17β stereoisomers. 17-phenylethynylestra - 1,3,5(10),16 - tetraen - 3-ol, for example, is hydrogenated in dioxane solution at a pressure of 60 pounds per square inch and 50° C. in the presence of 5% palladium-on-carbon catalyst, thereby affording 17-phenethylestra-1,3,5(10)-trien-3-ol.

An alternate method for obtaining the 3-(lower alkanoyl)oxy compounds of this invention comprises the reaction of the corresponding 3-ol with a lower alkanoic acid halide or anhydride, preferably in the presence of a suitable acid acceptor. The reaction of acetic anhydride and pyridine with 17-phenylvinylestra-1,3,5(10),16-tetraen-3-ol, for example, results in the corresponding 3-acetate.

The compounds of the present invention display valuable pharmacological properties. They are hormonal agents, for example, as is evidenced by their estrogenic and androgenic properties. They possess also hypocholesterolemic, pepsin inhibitory and anti-protozoal activity as indicated by their ability to inhibit the growth of such organisms as *Tetrahymena gelleii*. In addition, they are capable of inhibiting fertility in rats.

The invention will appear in further detail from a consideration of the following examples. These examples are given for the purpose of illustration only and are not to be construed as limiting the invention either in spirit or in scope. In these examples, temperatures are given in degrees centigrade (° C.) and materials in parts by weight unless otherwise noted.

Example 1

A solution of 5 parts of 17a-phenylethynyl-estra-1,3,5-(10)-3,17β-diol, 0.75 part of p-toluenesulfonic acid monohydrate and 92 parts of isopropenyl acetate is heated at the reflux temperature for about 9 hours, during which time the acetone formed is removed by slow distillation. The reaction mixture is cooled to room temperature and stored for about 16 hours, then is diluted with ether. The resulting organic solution is washed successively with water, 10% aqueous sodium carbonate and water, then is dried over anhydrous sodium sulfate containing decolorizing carbon and stripped of solvent by distillation under reduced pressure to afford the crude product as an oily residue. That material is purified by chromatography on silica gel followed by elution with 55% benzene in ethyl acetate to afford, after recrystallization from aqueous acetone, pure 17-phenylethynylestra-1,3,5(10),16-tetraen-3-ol 3-acetate, melting at about 142.5–144.5° and displaying an optical rotation of +11° in chloroform. This compound is illustrated by the following structural formula

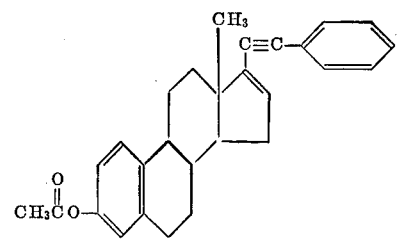

Example 2

When the procedure of Example 1 is repeated, substituting an equivalent quantity of isopropenyl propionate, there is produced 17-phenylethynylestra-1,3,5(10),16-tetraen-3-ol 3-propionate.

Example 3

A mixture containing 20 parts of 17α-phenylethynylestra-1,3,5(10)-triene-3,17β-diol, 120 parts of concentrated hydrochloric acid and 800 parts of methanol is heated at the reflux temperature for about 3 hours, then is partially concentrated under reduced pressure and diluted with water. The oily product which initially forms solidifies upon standing and is extracted into methanol. That organic solution is concentrated to dryness, and the residue is recrystallized from aqueous methanol to afford hydrated 17 - phenylethynylestra-1,3,5(10),16-tetraen-3-ol, melting at about 81–83°. Heating of that hydrated material at elevated temperature affords the anhydrous compound.

Example 4

To a solution of 8.5 parts of 17-phenylethynylestra-1,3,5(10),16-tetraen-3-ol in 200 parts of dioxane containing 50 parts of pyridine is added 0.85 part of 5% palladium-on-calcium carbonate catalyst, and the resulting mixture is shaken with hydrogen at room temperature and atmospheric pressure until one molecular equivalent of hydrogen is absorbed. Filtration of the mixture removes the catalyst, and the filtrate is stripped of solvent by distillation under reduced pressure to afford a dark oily residue. Chromatography of that material on silica gel followed by elution with 2% ethyl acetate in benzene affords the crude product which is purified by recrystallization from aqueous methanol to yield pure 17-phenylvinylestra-1,3,5(10),16-tetraen-3-ol, melting at about 90–95°. This substance is characterized further by infrared absorption maxima, in chloroform, at about 2.75, 3.42, 6.21 and 6.67 microns.

Example 5

A mixture containing 6.2 parts of 17-phenylvinylestra-1,3,5(10),16-tetraen-3-ol, 30 parts of acetic anhydride and 60 parts of pyridine is kept at room temperature for about 4 hours, then is poured carefully into cold water. The oil which forms is extracted into ether, and the ether solution is washed successively with water, dilute hydrochloric acid and dilute sodium bicarbonate, then dried over anhydrous sodium sulfate containing decolorizing carbon. Removal of the solvent by distillation under reduced pressure affords a glass-like residue, which is purified by chromatography on silica gel followed by elution with benzene, thus producing pure 17-phenylvinylestra-1,3,5-(10),16-tetraen-3-ol 3-acetate hemihydrate. This compound is characterized by infrared absorption maxima, in chloroform, at about 3.41, 5.68, 6.67, 7.28, and 8.09 microns.

Example 6

When an equivalent quantity of propionic anhydride is substituted in the procedure of Example 5, there is obtained 17 - phenylvinylestra-1,3,5(10),16-tetraen-3-ol 3-propionate.

Example 7

To a solution of 8.5 parts of 17-phenylethynylestra-1,3,5(10),16-tetraen-3-ol in 250 parts of dioxane is added 1.7 parts of 5% palladium-on-carbon catalyst, and that mixture is shaken with hydrogen at 60 pounds per square inch pressure and at 50° for about 9½ hours, during which time 3 molecular equivalents of hydrogen are absorbed. The catalyst is removed by filtration, and the resulting filtrate is concentrated to dryness under reduced pressure to afford a dark oily residue. That oily material is purified by chromatography on silica gel followed by elution with 2% ethyl acetate in benzene, thus producing, as an oil, pure 17-phenethylestra-1,3,5(10)-trien-3-ol, characterized by infrared absorption maxima, in chloroform, at about 2.75, 3.41, 6.21 and 6.64 microns.

Example 8

A mixture of 2 parts of 17-phenethylestra-1,3,5(10)-trien-3-ol, 20 parts of pyridine and 10 parts of acetic anhydride is stored at room temperature for about 16 hours, then is poured carefully into a mixture of ice and water. The resulting aqueous mixture is extracted with ether, and the organic solution is washed successively with dilute hydrochloric acid and dilute sodium bicarbonate, then dried over anhydrous sodium sulfate containing decolorizing carbon. Removal of the solvent by distillation under reduced pressure affords a glass-like residue, which is purified by recrystallization from aqueous methanol to yield 17-phenethylestra-1,3,5(10)trien-3-ol 3-acetate, melting at about 93–95°. This compound exhibits an optical rotation of +46.5° in chloroform.

Example 9

When an equivalent quantity of propionic anhydride is substituted in the procedure of Example 8, there is produced 17-phenethylestra-1,3,5(10)-trien-3-ol 3-propionate.

Example 10

By substituting an equivalent quantity of 17α-phenethylestra-1,3,5(10)-3,17β-diol and otherwise proceeding according to the processes described in Example 1, there is obtained 17-phenethylestra-1,3,5(10), 16-tetraen-3-ol 3-acetate.

Example 11

By substituting an equivalent quantity of 17α-phenethylestra-1,3,5(10)-triene-3,17β-diol and otherwise proceeding according to the processes described in Example 3, there is produced 17-phenethylestra-1,3,5(10), 16-tetraen-3-ol.

Example 12

The reaction of equivalent quantities of 17-phenethylestra-1,3,5(10), 16-tetraen-3-ol with propionic anhydride according to the procedure described in Example 5 results in 17-phenethylestra - 1,3,5(10), 16-tetraen-3-ol 3-propionate.

What is claimed is:

1. A compound of the formula

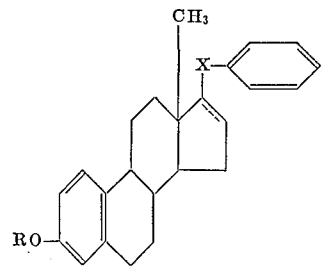

wherein R is selected from the group consisting of hydrogen and lower alkanoyl, X is a member of the class consisting of ethylene, vinylene and ethynylene and the dotted line symbolizes the optional presence of a 16,17 double bond.

2. As in claim 1, a compound of the formula

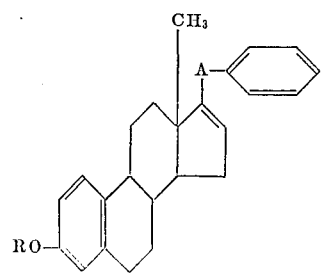

wherein R is selected from the group consisting of hydrogen and lower alkanoyl and A is a member of the class consisting of vinylene and ethynylene.

3. As in claim 1, a compound of the formula

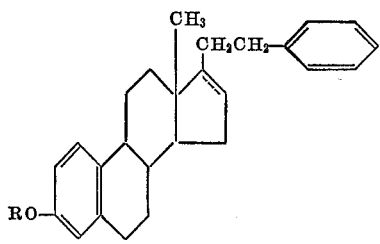

wherein R is selected from the group consisting of hydrogen and lower alkanoyl and the dotted line symbolizes the optional presence of a 16,17 double bond.

4. As in claim 1, 17-phenylethynylestra-1,3,5(10), 16-tetraen-3-ol 3-acetate.

5. As in claim 1, 17-phenethylestra-1,3,5(10)-trien-3-ol.

6. As in claim 1, 17-phenylvinylestra-1,3,5(10), 16-tetraen-3-ol.

7. As in claim 1, 17-phenylvinylestra-1,3,5(10), 16-tetraen-3-ol 3-acetate.

8. As in claim 1, 17-phenethylestra-1,3,5(10)-trien-3-ol 3-acetate.

References Cited

UNITED STATES PATENTS 3,193,564   7/1965   Counsell et al.

HENRY FRENCH, *Primary Examiner.*